United States Patent
Sung et al.

(10) Patent No.: US 9,419,713 B2
(45) Date of Patent: Aug. 16, 2016

(54) VISIBLE LIGHT COMMUNICATION METHOD

(71) Applicant: National Chiao Tung University, Hsinchu (TW)

(72) Inventors: Jiun-Yu Sung, New Taipei (TW); Chien-Hung Yeh, New Taipei (TW); Chi-Wai Chow, Fanling (HK)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 82 days.

(21) Appl. No.: 14/511,683

(22) Filed: Oct. 10, 2014

(65) Prior Publication Data
US 2015/0304030 A1   Oct. 22, 2015

(30) Foreign Application Priority Data
Apr. 18, 2014 (TW) ............................. 103114161 A (51) Int. Cl.
*H04B 10/00* (2013.01)
*H04B 10/116* (2013.01)
*H04L 27/26* (2006.01)

(52) U.S. Cl.
CPC .......... *H04B 10/116* (2013.01); *H04L 27/2601* (2013.01); *H04L 27/2697* (2013.01)

(58) Field of Classification Search
CPC .................... H04B 10/116; H04L 27/2601
See application file for complete search history.

(56) References Cited

U.S. PATENT DOCUMENTS

| 2012/0087677 A1* | 4/2012 | Jang | H04B 10/116 398/183 |
| 2012/0224655 A1* | 9/2012 | Lim | H04L 27/2623 375/302 |
| 2012/0257898 A1* | 10/2012 | Yokoi | H04L 27/2697 398/76 |

(Continued)

FOREIGN PATENT DOCUMENTS

| EP | 2 103 064 B1 | 8/2011 |
| EP | 2 000 007 B1 | 6/2012 |
| WO | WO 2013/013430 A1 | 1/2013 |

OTHER PUBLICATIONS

Ntogari et al., "Combining Illumination Dimming Based on Pulse-Width Modulation With Visible-Light Communications Based on Discrete Multitone," J. Opt. Commun. Netw., vol. 3, No. 1, pp. 56-65 (Jan. 2011).

(Continued)

*Primary Examiner* — Dzung Tran
(74) *Attorney, Agent, or Firm* — Muncy, Geissler, Olds & Lowe, P.C.

(57) ABSTRACT

A visible light communication method. Firstly, a plurality of binary logic streams is sequentially received and a serial-to-parallel conversion is performed on them to obtain a plurality of binary signal sets corresponding to each binary logic stream. Then, all the binary signal sets are respectively mapped to obtain the first OFDM symbols in frequency domain. The first OFDM symbols are respectively transformed into the second OFDM symbols in time domain. Then, a parallel-to-serial conversion is performed on the second OFDM symbols. Adequate cyclic prefix is added in each of the second OFDM symbols. Next, the relative intensity of each of the second OFDM symbols is regulated, and then a digital-to-analog conversion is performed on the second OFDM symbols to obtain analog electrical signals. Finally, visible lights respectively corresponding to the analog electrical signals are generated.

4 Claims, 6 Drawing Sheets

(56) References Cited

U.S. PATENT DOCUMENTS

| | | | |
|---|---|---|---|
| 2013/0004182 A1 | 1/2013 | Kim et al. | |
| 2013/0259161 A1* | 10/2013 | Lim | H04L 27/2624 375/302 |
| 2013/0266314 A1* | 10/2013 | Lee | H04B 10/116 398/43 |
| 2014/0029952 A1* | 1/2014 | Liu | H04B 10/116 398/115 |

OTHER PUBLICATIONS

Lee et al., "Modulations fir Visible Light Communications With Dimming Control," IEEE Photonics Tech. Lett., vol. 23, No. 16, pp. 1136-1138 (Aug. 15, 2011).

Choi et al., "Visible Light Communications with Color and Dimming Control by Employing VPPM Coding," IEEE Proc. ICUFN, pp. 10-12 (2012).

Jang et al., "PWM-based PPM Format for Dimming Control in Visible Light Communication System," 8th IEEE, IET Int'l Symp. on Comm. Sys., Networks & Dig. Sig. Proc., pp. 1-5 (2012).

Sung et al., "Dimming-discrete-multi-tone (DMT) for simultaneous color control and high speed visible light communication," Optics Express, vol. 22, No. 7, pp. 7538-7543 (Mar. 25, 2014).

Chow et al, "Adaptive scheme for maintaining the performance of the in-home white-LED visible light wireless communications using OFDM," Optics Communications, 2013, p. 49-52, vol. 292.

* cited by examiner

VISIBLE LIGHT COMMUNICATION METHOD

This application claims priority for Taiwan patent application no. 103114161 filed at Apr. 18, 2014, the content of which is incorporated by reference in its entirely.

BACKGROUND OF THE INVENTION

1. Field of the Invention

The present invention relates to a communication method, particularly to a visible light communication method.

2. Description of the Related Art

Visible light communication (VLC) generally refers to short distance communication using a visible light wavelength of 380~780 nm. Compared with ordinary light sources, light emitting diodes (LEDs) feature high lighting efficiency, high modulation speed, long life, etc. As a result, LEDs are viewed as main stream illumination sources in next generation. VLC can transmit data using the existing illumination and display equipments; hence it is fascinating for its additional economical value. Moreover, high-speed modulation capability of LEDs also urges VLC into a studying issue which is highly concerned.

According to the CIE1931 model, a specific color can be generated by mixing a specific intensity ratio among R, G and B lighting colors. Let the total power of the R, G, and B sources be fixed under a specific value. The relative intensities of the R, G, and B sources are then normalized by this total power. The final output color composed by the three colors is defined on a 2-dimension plane. By controlling the relative intensities among the three color sources, any color can ideally be obtained. Dimming refers to modulating the brightness of an illumination source. Dimming technique is especially beneficial for the illumination and display systems for it can provide high illumination/display qualities, such as color uniformity and color precision. Moreover, dimming can also be used to more efficiently using energy. Hence, high-speed and precise dimming methods are prosperously pursued.

Analog modulation and pulse-width modulation (PWM) are two common dimming methods. Analog modulation refers to modulating the brightness of a LED by adjusting the injection current of the LED. By moderately adjusting the relative intensities of the three color LEDs, arbitrary color can be obtained according to the CIE1931 model. However, analog modulation suffers from low illumination/display quality for its gradual color transition appears while any two specific colors are switched from each other. Consequently, dimming by analog modulation can not satisfy the requirement for the high-quality illumination and display systems. On the other hand, according the human sensation mechanisms, the color and brightness perceived by a human eye are determined by the total received energy of light within a specific interval. Based on this principle, PWM divides the light irradiated by each LED into several discrete pulses with different pulse widths. Hence, the total light energy received by a human eye can be adjusted by moderately controlling the widths and the amount of the pulses within the sensation interval (integration time of a human eye). Dimming using PWM can reduce color shift due to analog variations. Dimming using PWM can also use energy more efficiently because light is radiated only while the discrete pulses are sent.

In the applications of VLC, a LED itself is an incoherent source. Thus, only the amplitude of light can be modulated for transmission signals. As mentioned above, controlling the color and brightness of light also relates to modulate the amplitude of light. It is difficult for a receiver to distinguish a signal from its receiving power level because the power of the discrete pulses should not be changed or the brightness and color of the output light may be varied. The receiver will always receive the power level determined by the dimming requirement. Variable pulse position modulation (VPPM), PWM-based PPM, etc. are proposed to mitigate this dilemma to realize simultaneous dimming and signal transmission. Nevertheless, it is impractical to realize high-speed VLC using the abovementioned modulation formats. The reasons are described as the following: (1) Transmission signals cannot most efficiently use the bandwidth of a LED because in a PPM and PWM system, data can only be loaded while the PWM pulses are sent. (2) The jitter and multipath will decrease the signal performance. As a result, the signal speed cannot be too fast (the lower the data speed is, the lower the demands for precision of locating data time are) lest bit error occur. (3) The data allocation for different transmission channels cannot be optimized.

To overcome the abovementioned problems, the present invention provides a VLC method, so as to solve the aforementioned problems of the prior art.

SUMMARY OF THE INVENTION

The primary objective of the present invention is to provide a VLC method, which can simultaneously realize high-speed VLC, brightness and color control of LEDs, and real-time continuous data transmission. A new coding technique cooperating with orthogonal frequency division multiplexing (OFDM) modulation is proposed to realize the purposes. The proposed method is beneficial for the high-speed VLC because it can more efficiently use the limiting bandwidth of LEDs.

To achieve the abovementioned objectives, the present invention provides a VLC method. Firstly, a plurality of binary logic streams is sequentially received, and a serial-to-parallel conversion is performed on each binary logic stream to obtain a plurality of binary signal sets corresponding to each binary logic stream. Then, the binary signal sets corresponding to each binary logic stream are respectively mapped to a plurality of sub-carrier symbols of a first orthogonal frequency-division multiplexing (OFDM) symbol in frequency domain, thereby obtaining a plurality of the first OFDM symbols, and some specific sub-carrier symbols are assigned to the reserved sub-carriers of each first OFDM symbol. The specific sub-carrier symbols for the reserved sub-carrier are known by the transmitting terminal and the receiving terminal to perform equalization at the receiving terminal. Then, the first OFDM symbols are respectively transformed into a plurality of second OFDM symbols in time domain. Then, a parallel-to-serial conversion is performed on the second OFDM symbols. A cyclic prefix (CP) with a specific length is added in each second OFDM symbol to reduce inter-symbol interference (ISI) degradation to signals. Each of the second OFDM symbols is normalized in its average power. After normalizing power of the second OFDM symbols, the relative intensity of each of the second OFDM symbols is respectively regulated according to intensity and color requirements. A plurality of third OFDM symbols is generated after the second OFDM symbols are normalized and regulated in power. Then, a digital-to-analog conversion is performed on the third OFDM symbols to respectively obtain a plurality of electrical analog signals. Finally, visible light signals are respectively generated according to the electrical analog signals.

Below, the embodiments are described in detail in cooperation with the drawings to make more easily understand the technical contents, characteristics and accomplishments of the present invention.

BRIEF DESCRIPTION OF THE DRAWINGS

FIG. 3 (a) is a diagram showing the relative intensity of the fourth orthogonal frequency-division multiplexing (OFDM) symbols according to an embodiment of the present invention;

FIG. 3 (b) is a diagram showing the relative intensity of the third OFDM symbols according to an embodiment of the present invention;

DETAILED DESCRIPTION OF THE INVENTION

The VLC system comprises an electrical signal generator, a red light LED, a green light LED, a blue light LED, a red light filter, a green light filter, a blue light filter, three light receivers, and two processors. The LEDs respectively receive three electrical signals generated by the electrical signal generators to respectively red light, green light and blue light. The red light, the green light and the blue light respectively are transmitted towards the light receivers through the filters. The light receivers convert the red light, the green light and the blue light into three electrical signals processed by the processor.

The light perceived by a human eye is an average light power received within a specific interval. As a result, if the human eye is viewed as a light receiver, the light energy I perceived by the human eye from $t=t_0$ to $t=\tau$ is expressed by equation (1):

$$I = \lim_{\tau \to \infty} \frac{1}{\tau - t_0} \int_{t_0}^{\tau} P(t) dt \qquad (1)$$

P(t) is the light power perceived by the human eye at time t. Let the signals transmitting from an arbitrary LED are composed of sequential pulses, which have arbitrary shapes according to the signal transmitted at the corresponding interval. Each pulse has the same pulse width. Here, the pulse width refers to the time duration a pulse is transmitted. If each pulse is normalized in power, such that all pulses have the same average power, the present invention can express the light intensity perceived by a human eye as equation (2):

$$I = \sum_k P_{avg\_pulse,k} \qquad (2)$$

$P_{avg\_pulse,k}$ is the average power of the kth pulse. As described above, each pulse with arbitrary shape has the same pulse width that is transmitted within a specific time interval. Hence, each OFDM signal, obtained after digital-to-analog conversion of a OFMM symbol, can be viewed as an above-mentioned pulse. An OFDM signal $S_{OFDM}(t)$ can be expressed as equation (3):

$$S_{OFDM}(t) = \sum_{k=0}^{N-1} x_k e^{j2\pi \frac{k}{N \cdot \Delta t} t}, t \in [0, N \cdot \Delta t), \qquad (3)$$

where $\Delta t$ is the sampling time interval of the digital OFDM signal in time domain, N is FFT (Fast Fourier Transform) size, $x_k$ is a sub-carrier symbol assigned to each sub-carrier of the OFDM symbol, and k is the index denoting different sub-carriers. $N\Delta t$ is a total time length of an OFDM symbol. Each OFDM symbol may further be normalized as equation (4):

$$\frac{1}{N \cdot \Delta t} \sqrt{\int_0^{N \cdot \Delta t} |S_{OFDM\_normalize}(t)|^2 dt} = C, \qquad (4)$$

where C is a constant, $S_{OFDM\_normalize}(t)$ is the normalized OFDM signal. Within $N\Delta t$, the transmitted signal S(t), which can simultaneous dimming and communication, is expressed as equation (5):

$$S(t) = \xi_q \cdot S_{OFDM\_normalize}(t), t \in [0, N \cdot \Delta t), \qquad (5)$$

where $\xi_q$ is a specific constant. If each OFDM symbol is sequentially labeled by a unique index q, according to equations (2)-(5), equation (6) can be obtained:

$$I = \sum_k P_{avg\_pulse,k} = \qquad (6)$$

$$\frac{1}{N \cdot \Delta t} \sqrt{\int_0^{N \cdot \Delta t} |S_{OFDM\_normalize}(t)|^2 \cdot dt} \cdot \sum_{q=1}^{Q} \xi_q = C \cdot \sum_{q=1}^{Q} \xi_q,$$

where Q is the amount of the OFDM symbols within the integration time of the human eye. Since the final perceived power can be adjusted by synchronously tuning the output power of the R, G, and B LEDs, only a case involving one specific total power is considered here. Once the total power is fixed, a specific color can be obtained by moderately adjusting the relative intensity among the R, G, and B LEDs. Consequentially, the received light power is normalized, and can be expressed as equation (7):

$$I_{normalize} = \sum_{q=1}^{Q} \xi_q \qquad (7)$$

The power of each OFDM symbol is changed via adjusting $\xi_q$ to determine the relative intensity of the received R, G, and B LEDs. Taking consideration of linear approximation, each OFDM symbol cannot be distorted due to $\xi_q$. Thus, the OFDM symbol and $\xi_q$ should be viewed as two independent components. Hence, high speed, high spectrum efficiency, and anti-multipath fading of the OFDM technology are efficiently used to realize a high speed visible light communication (VLC). The present invention provides the special modulation method as equation (5) to realize the high speed VLC with dimming function. In the present invention, communication data can be efficiently transmitted at the highest speed without distorting signals, which is not disclosed in any present technology.

The light brightness perceived by a human eye is mainly determined by the average of lighting intensity of a LED within a specific interval. Let 1 denote the brightest light that the human eye able to perceive. Let 0 denote full black. Suppose that the OFDM symbols have the maximum of average power when $\xi_q=1$. The dimming range D realized can be expressed as equation (8):

$$D \in \left[ \frac{B_{min} + f \cdot \xi_{q\_min}}{B_{max} + f \cdot \xi_{q\_max}}, 1 \right] \tag{8}$$

$B_{max}$ and $B_{min}$ are respectively the maximum and the minimum of DC bias of the electrical signal generator. f is a root-mean-square value of AC voltage or AC current corresponding to the maximum of average power of the encoding signal. $\xi_{q\_max}$ and $\xi_{q\_min}$ are respectively the maximum and the minimum of $\xi_q$ making the OFDM symbol achieve the threshold of bit error rate (BER). Besides, $\xi_{q\_max}=1$.

Suppose that the LED always operates at forward bias. Fix the ratio of DC bias to a root-mean-square value of AC average power. The maximum of the ratio is $\sqrt{2}$ and let $\xi_{q\_min}$ be 0.3. After estimation, the ideal dimming range D can be $$\left[ \frac{\sqrt{2} \cdot f \cdot 0.3 + f \cdot 0.3}{\sqrt{2} \cdot f + f \cdot 1}, 1 \right] \approx [0.3, 1].$$

Figure 1:
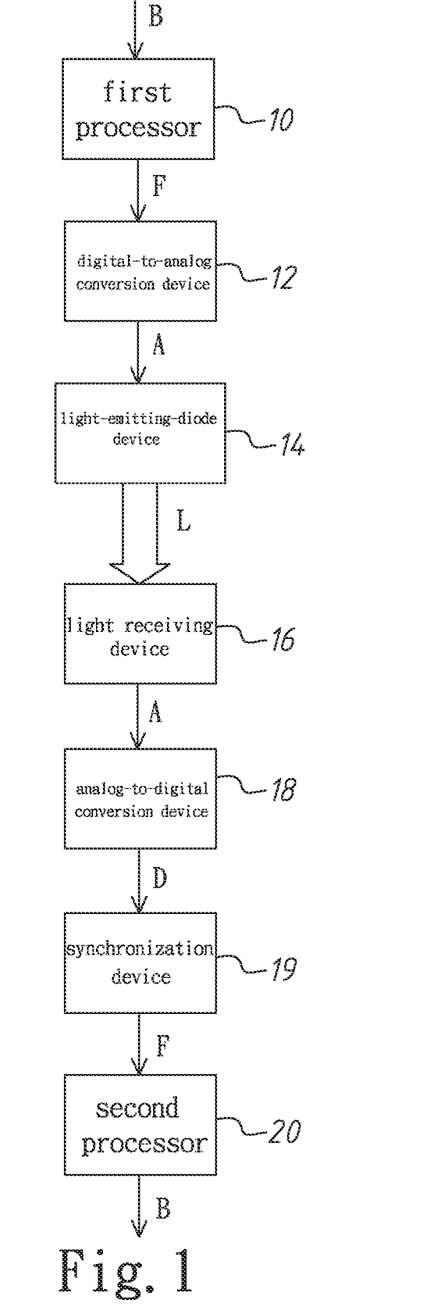
FIG. 1 is a block diagram showing a communication device performing a VLC method according to an embodiment of the present invention.
Figure 2:
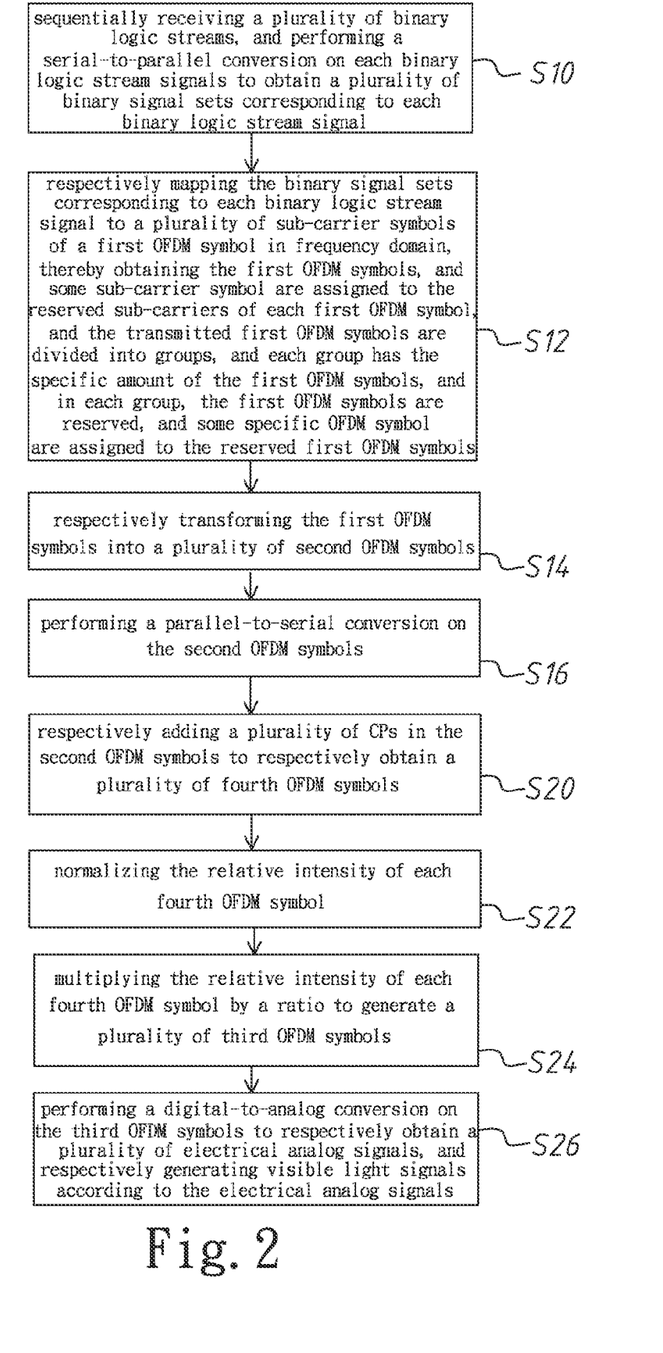
FIG. 2 is a flowchart diagram showing an encoding method according to an embodiment of the present invention.
Figure 3A:
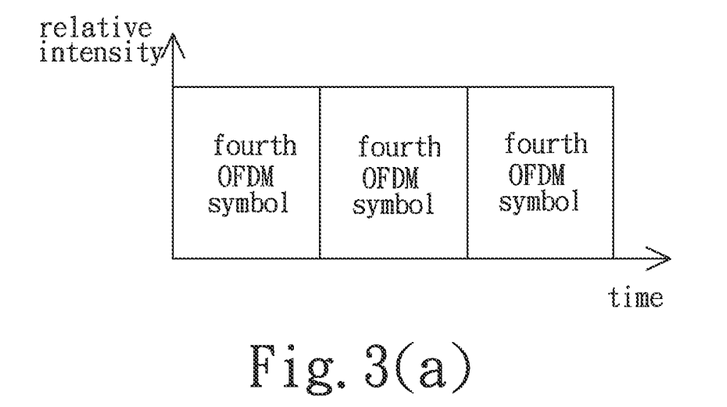
Figure 3B:
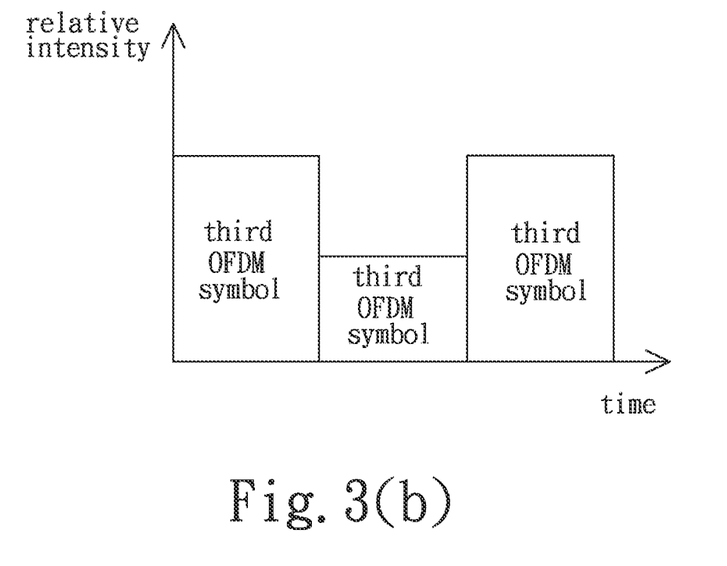

Refer to FIG. 1 and FIG. 2. The encoding process of the present invention is introduced. A communication device of the present invention comprises a first processor 10 coupled to a digital-to-analog conversion device 12 and a light-emitting-diode device 14 in order. A light receiving device 16 is sequentially coupled to an analog-to-digital conversion device 18, a synchronization device 19 and a second processor 20. Firstly, in Step S10, the first processor 10 sequentially receives a plurality of binary logic streams B, and performs a serial-to-parallel conversion on each binary logic stream B to obtain a plurality of binary signal sets corresponding to each binary logic stream B. Then, in Step S12, the first processor 10 respectively maps the binary signal sets corresponding to each binary logic stream B to a plurality of sub-carrier symbols of a first orthogonal frequency-division multiplexing (OFDM) symbol in frequency domain, thereby obtaining a plurality of the first OFDM symbols. The sub-carrier of high order can provide higher spectrum efficiency, and some specific sub-carrier symbols are assigned to the reserved sub-carriers of each first OFDM symbol. The transmitted first OFDM symbols are sequentially divided into a plurality of groups. Each group has the specific amount of the first OFDM symbols. In each group, some first OFDM symbols are reserved, and some specific OFDM symbol are assigned to the reserved first OFDM symbols. The specific sub-carrier symbols for the reserved OFDM symbols are known by the first processor 10 of the transmitting terminal and the second processor 20 of the receiving terminal, so that the second processor 20 can perform equalization and power compensation of the symbols. Then, in Step S14, the first processor 10 respectively transforms the first OFDM symbols into a plurality of second OFDM symbols in time domain using Inverse Fast Fourier Transform. Then, in Step S16, the first processor 10 performs a parallel-to-serial conversion on all the second OFDM symbols. Then, in Step S20, the first processor 10 respectively adds a plurality of cyclic prefixes (CPs) in the second OFDM symbols according to the transmission speeds and the channel properties of the second OFDM symbols to respectively obtain a plurality of fourth OFDM symbols. The CPs can reduce inter-symbol interference (ISI) degradation to signals. In order to simplify the concept, the CP is not shown in equation (5). Then, in Step S22, the first processor 10 normalizes the relative intensity of each fourth OFDM symbol whereby each fourth OFDM symbol has the same average power, as shown in FIG. 3 (a). Afterwards, in Step S24, according to the requirement for color and brightness of light, the first processor 10 multiplies the relative intensity of each fourth OFDM symbol by a ratio to generate a plurality of third OFDM symbols F, as shown in FIG. 3 (b). The ratio is $\xi_q$. Finally, in Step S26, the digital-to-analog conversion device 12 receives the third OFDM symbols F, and performs a digital-to-analog conversion on the third OFDM symbols F to respectively obtain a plurality of electrical analog signals A. The light-emitting-diode device 14 receives the electrical analog signals A to respectively generate visible light signals L according to the electrical analog signals A.

Figure 4:
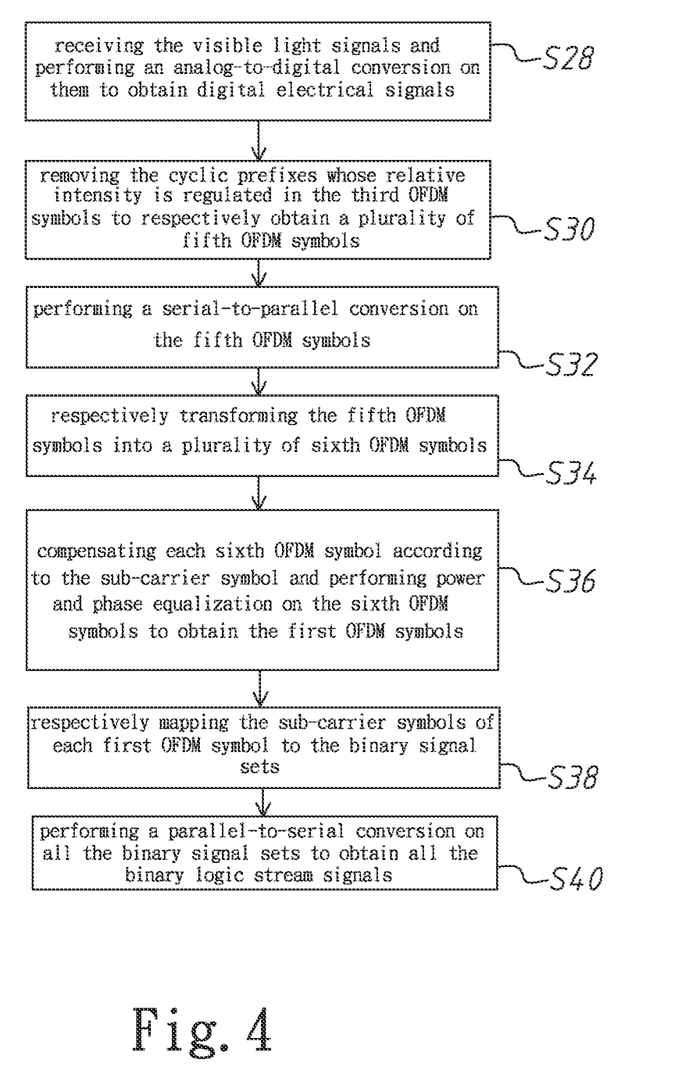
FIG. 4 is a flowchart diagram showing a decoding method according to an embodiment of the present invention.

Refer to FIG. 4. The decoding process of the present invention is introduced. Firstly, in Step S28, the light receiving device 16 receives the visible light signals L and converts the visible light signals L into the electrical analog signals A. The analog-to-digital conversion device 18 receives the electrical analog signals A and performs an analog-to-digital conversion on the electrical analog signals A to obtain digital electrical signals D. Afterwards, the synchronization device 19 receives the digital electrical signals D and synchronizes the digital electrical signals D to obtain the third OFDM symbols F. Then, in Step S30, the second processor 20 receives the third OFDM symbols F and removes the cyclic prefixes whose relative intensity is regulated in the third OFDM symbols F to respectively obtain a plurality of fifth OFDM symbols. Then, in Step S32, the second processor 20 performs a serial-to-parallel conversion on the fifth OFDM symbols. Then, in Step S34, the second processor 20 respectively transforms the fifth OFDM symbols into a plurality of sixth OFDM symbols in frequency domain using Fast Fourier Transform. Then, in Step S36, the second processor 20 estimates the $\xi_q$ multiplied by the fourth OFDM symbols according to the specific sub-carrier symbols, thereby compensating the relative intensity of each sixth OFDM symbol. Then, the second processor 20 performs power and phase equalization on the sixth OFDM symbols to obtain the first OFDM symbols. Then, in Step S38, the second processor 20 respectively maps the sub-carrier symbols of each first OFDM symbol to the binary signal sets corresponding to each binary logic stream B. Finally, in Step S40, the second processor 20 performs a parallel-to-serial conversion on all the binary signal sets corresponding to each binary logic stream B to obtain all the binary logic streams B, thereby achieving high speed VLC.

In the visible light communication method, Steps S20-S24 are replaced with a regulation step of using the first processor 10 directly regulating the relative intensity of each second OFDM symbol to generating the third OFDM symbols F.

Besides, the present invention only performs the encoding process and the decoding process is omitted, whereby VLC is also achieved.

Figure 5:
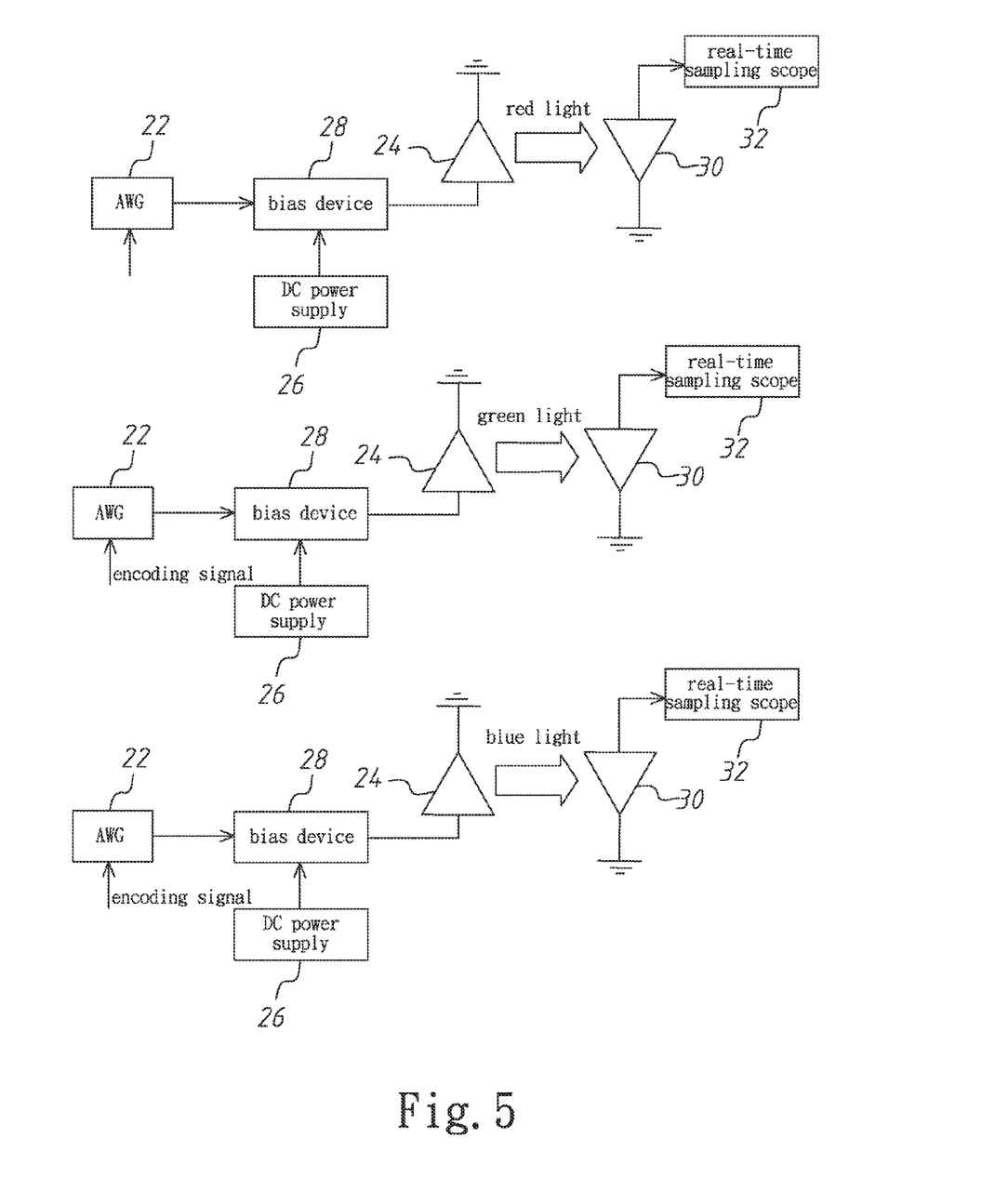
FIG. 5 is a diagram schematically showing an experimental architecture according to an embodiment of the present invention.
Figure 6:
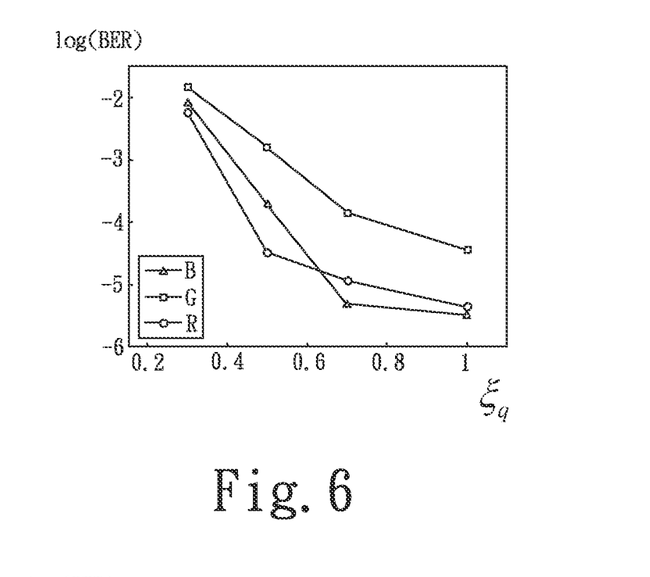
FIG. 6 is a diagram schematically showing a comparison of $\xi_q$ to bit error rates of visible light signals of the present invention.
Figure 7:
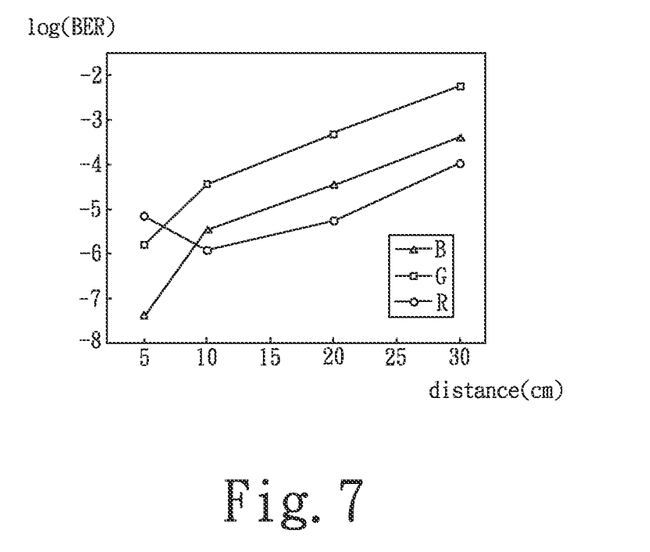
FIG. 7 is a diagram schematically showing a comparison of transmission distance to bit error rates of visible light signals of the present invention.

The present invention experiments with the architecture of FIG. 5. The encoding signals generated by a computer are respectively transmitted to arbitrary waveform generators (AWGs) 22. DC power supplies 26 respectively bias LEDs 24. An input signal of the LED 24 is an output AC signal of the AWG 22 plus a DC signal of the DC power supply 26. The AWG 22 and the DC power supply 26 are coupled to the LED 24 through a bias device 28. A receiving terminal uses an optical receiver (photo-diode, PD) 30 to convert a light signal into an electrical signal. A real-time sampling scope 32 receives the electrical signal and the computer demodulates it. Red light, green light and blue light are respectively received and emitted. The value read by the real-time sampling scopes 32, the spectrums of the optical signals of the LEDs 24, the response spectrums of the electrical signals of the optical receivers 30 and the color matching function of the CIE 1931 model are used to determine light colors. The experiment results are shown in FIG. 6 and FIG. 7. A circle, a square and a triangle respectively denote the datum of red, green and blue light. FIG. 6 is a diagram schematically showing a comparison of $\xi_q$ to bit error rates of the visible light signals of the present invention. FIG. 7 is a diagram schematically showing a comparison of transmission distance to bit error rates of the visible light signals of the present invention. From the experiment, when FFT size is 128, the performance of the visible light signal of the present invention is the best, and $\xi_{q\_min}$ can reach less than $3.8 \times 10^{-3}$, and the data rate is 32.5 M bit/s, and the mixed color of the three color LEDs has a coordinate of (x,y)=(0.26, 0.27) in the CIE 1931 model.

In conclusion, the present invention specially encodes OFDM signals to simultaneously achieve high speed visible light communication, brightness and color control of LEDs, and real-time continuous data transmission.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A visible light communication method comprising steps of:
   sequentially receiving a plurality of binary logic streams, and performing a serial-to-parallel conversion on each said binary logic stream to obtain a plurality of binary signal sets corresponding to each said binary logic stream;
   respectively mapping said binary signal sets corresponding to each said binary logic stream to a plurality of sub-carrier symbols of a first orthogonal frequency-division multiplexing (OFDM) symbol in frequency domain, thereby obtaining a plurality of said first OFDM symbols, and said sub-carrier symbol is assigned to sub-carriers of each said first OFDM symbol;
   respectively transforming said first OFDM symbols into a plurality of second OFDM symbols in time domain;
   performing a parallel-to-serial conversion on said second OFDM symbols;
   respectively adding a plurality of cyclic prefixes in said second OFDM symbols according to transmission speeds of said second OFDM symbols to respectively obtain a plurality of fourth OFDM symbols;
   normalizing relative intensity of each said fourth OFDM symbol;
   multiplying said relative intensity of each said fourth OFDM symbol by a ratio to generate a plurality of third OFDM symbols; and
   performing a digital-to-analog conversion on said third OFDM symbols to respectively obtain a plurality of electrical analog signals, and respectively generating visible light signals according to said electrical analog signals.

2. The visible light communication method according to claim 1, wherein in said step of respectively transforming said first OFDM symbols into said second OFDM symbols, said first OFDM symbols are transformed into said second OFDM symbols using Inverse Fast Fourier Transform.

3. The visible light communication method according to claim 1, further comprises steps of:
   receiving said visible light signals and converting said visible light signals into said electrical analog signals, and then sequentially performing an analog-to-digital conversion and a synchronization process on said electrical analog signals to obtain said third OFDM symbols;
   removing said cyclic prefixes whose relative intensity is regulated in said third OFDM symbols to respectively obtain a plurality of fifth OFDM symbols;
   performing a serial-to-parallel conversion on said fifth OFDM symbols;
   respectively transforming said fifth OFDM symbols into a plurality of sixth OFDM symbols in frequency domain;
   compensating relative intensity of each said sixth OFDM symbol according to said sub-carrier symbol to obtain said first OFDM symbols;
   respectively mapping said sub-carrier symbols of each said first OFDM symbol to said binary signal sets corresponding to each said binary logic stream; and
   performing a parallel-to-serial conversion on said binary signal sets corresponding to each said binary logic stream to obtain said binary logic streams.

4. The visible light communication method according to claim 3, wherein in said step of respectively transforming said fifth OFDM symbols into said sixth OFDM symbols, said fifth OFDM symbols are transformed into said sixth OFDM symbols using Fast Fourier Transform.

* * * * *